(12) United States Patent
Lahoda

(10) Patent No.: US 11,062,810 B2
(45) Date of Patent: Jul. 13, 2021

(54) MANUFACTURE OF LARGE GRAIN POWDERS WITH GRANULAR COATINGS

(71) Applicant: Westinghouse Electric Company LLC, Cranberry Township, PA (US)

(72) Inventor: Edward J. Lahoda, Edgewood, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/377,528

(22) Filed: Apr. 8, 2019

(65) Prior Publication Data
US 2020/0027586 A1  Jan. 23, 2020

Related U.S. Application Data

(60) Provisional application No. 62/654,666, filed on Apr. 9, 2018.

(51) Int. Cl.
*G21C 3/60* (2006.01)
*G21C 3/07* (2006.01)

(52) U.S. Cl.
CPC .................. *G21C 3/60* (2013.01); *G21C 3/07* (2013.01)

(58) Field of Classification Search
CPC ............ G21C 3/60; G21C 3/07; G21C 3/045; G21C 3/62
See application file for complete search history.

(56) References Cited

U.S. PATENT DOCUMENTS

| 4,869,866 A * | 9/1989 | Lay ..................... G21C 3/623 376/421 |
| 5,422,920 A * | 6/1995 | Fujiwara ................ G01N 5/00 376/245 |
| 6,808,656 B2 * | 10/2004 | Gradel .................. G21C 3/623 264/5 |
| 2011/0206174 A1 | 8/2011 | Hallstadius et al. |
| 2013/0240805 A1 | 9/2013 | Kang et al. |
| 2019/0127876 A1 | 5/2019 | Yang et al. |

FOREIGN PATENT DOCUMENTS

| CN | 107731318 A | 2/2018 |
| JP | 2645463 B2 | 8/1997 |
| JP | 2011033504 A | 2/2011 |

OTHER PUBLICATIONS

International Search Report and Written Opinion for corresponding International PCT Application No. PCT/US2019/026268, dated Dec. 18, 2019.

* cited by examiner

*Primary Examiner* — Andrew J. Oyer
(74) *Attorney, Agent, or Firm* — K&L Gates LLP

(57) ABSTRACT

The invention relates generally to uranium fuel in a nuclear reactor and, more particularly, the inclusion of a fuel additive component to the bulk fuel material. The fuel additive component is selected and provided in an amount such that it is effective to improve one or more properties of the bulk fuel material. The fuel additive component has a grain size that is less than the grain size of the bulk fuel material. The granular fuel additive component coats or covers the granular bulk fuel material.

13 Claims, No Drawings

MANUFACTURE OF LARGE GRAIN POWDERS WITH GRANULAR COATINGS

CROSS-REFERENCE TO RELATED APPLICATION

This application claims priority under 35 U.S.C. § 119(e) to U.S. Provisional Patent Application Ser. No. 62/654,666, filed Apr. 9, 2018, entitled "MANUFACTURE OF LARGE GRAIN POWDERS WITH GRANULAR COATINGS", which is herein incorporated by reference.

GOVERNMENT SUPPORT

The invention was made with government support under DE-NE0008222 and DE-NE0008824 awarded by the Department of Energy. The government has certain rights in the invention.

FIELD OF THE INVENTION

The invention relates generally to uranium fuel in a nuclear reactor and, more particularly, to uranium fuel pellets including large grains of a first component having a coating formed thereon from a second component of smaller grains. The use of a smaller grain additive to a larger grain bulk powder improves properties of the bulk powder and the resultant fuel pellet, such as, water resistance.

BACKGROUND

A nuclear reactor power plant generates electric power as a result of the nuclear fission of radioactive materials contained within the nuclear reactor. In nuclear reactors, the radioactive material used for generating electric power is nuclear fuel. Nuclear fuel assemblies for light water nuclear reactors, such as, for example, pressurized water reactors (PWRs) and boiling water reactors (BWRs), generally include a plurality of fuel rods with circular cross-sections that are arranged parallel to one another at regularly or irregularly spaced intervals. Each fuel rod comprises a stack of fuel pellets surrounded with cladding. The fuel rods are held at the spaced intervals with respect to one another by one or more spacer grids.

The fuel rods each contain nuclear fuel fissile material, such as, at least one of uranium dioxide ($UO_2$), plutonium dioxide ($PuO_2$), thorium dioxide ($ThO_2$), uranium nitride (UN) and uranium silicide ($U_3Si_2$) and mixtures thereof. The form of the nuclear fuel fissile material is a stack of nuclear fuel pellets. Annular or particle forms of fuel also can be used. At least a portion of the fuel rods can also include neutron absorbing material, such as, boron or boron compounds, gadolinium or gadolinium compounds, erbium or erbium compounds and the like. The neutron absorbing material may be present on or in the pellets.

There are various instances wherein it is desired to improve properties of the nuclear fuel. For example, it may be desired to improve the thermal conductivity of $UO_2$ and/or water resistance of $U_3Si_2$ and UN. The improvement can be realized as a result of mixing a low melting component having the desired properties with a bulk material in pelleting, and then pelletize and sinter the pellets. Wherein it is desired to improve or increase water resistance of UN, for example, the small addition of a component having a lower melting point, such as, $U_3Si_2$ (melting point of 1665° C.), with UN (melting point of 2800° C.) is effective to increase the water resistance of UN. Alternatively, a high melting point additive may be desired (for example $UO_2$) to be added to a lower melting point fuel such as $U_3Si_2$ in order to increase the oxidation resistance of the $U_3Si_2$. It is not feasible, however, to depend on the additive to melt and distribute itself along the grain boundaries of the bulk of the powder.

When both of the additive and bulk materials are powders, it has been found that a significant or large amount of the low melting additive component needs to be added to the bulk material in order to achieve the improvement. As a result of adding this amount, there is a reduction in the uranium concentrations of the bulk material, in turn, making the resultant fuel economically untenable.

Thus, there is a desire in the art to develop a nuclear fuel that includes a bulk powder material and an additive powder component wherein the additive is present in an amount that does not significantly reduce the uranium concentration of the bulk powder material and the resulting fuel. The invention provides uranium fuel having a bulk large grain powder, and a smaller grain powder additive (as compared to the large grain bulk powder) that is present in an optimal, e.g., minimal, amount needed to achieve an improvement, such as, water resistance.

SUMMARY OF THE INVENTION

In one aspect, the invention provides a nuclear fuel including a bulk fuel material in a powder form; and a fuel additive component selected from the group consisting of metal, metal alloy, metal oxide, metalloid oxide, metal carbide, metalloid carbide, metal nitride, metalloid nitride and mixtures or alloys thereof in a powder form, wherein the grain size of the bulk fuel material is larger than the grain size of the fuel additive component.

The grain size in the fuel additive component is less than Vr*Rl/4, wherein "Vr" is the desired volume ratio of the fuel additive component to the bulk fuel material and "Rl" is the radius of (larger) grains in the bulk fuel material.

The volume ratio of the grain size of the fuel additive component to grain size of the bulk fuel material is greater than 4*Rs/Rl, wherein "Rs" is the radius of the smaller grains in the fuel additive component and "Rl" is the radius of the larger grains in the bulk fuel material.

In certain embodiments, the fuel additive component is selected from the group consisting of metal chromium (Cr), zirconium (Zr), aluminum (Al) and aluminum chromium (AlCr) alloy, uranium dioxide ($UO_2$), oxides of beryllium (BeO), zirconium ($ZrO_2$), chromium ($Cr_2O_3$), titanium ($TiO_2$) and yttrium ($Y_2O_3$), and mixtures and combinations thereof.

The fuel additive component may be in the form of a glass comprising an element selected from the group consisting of aluminum (Al), boron (B), silicon (Si), sodium (Na), lithium (Li), and compounds and combinations thereof.

The bulk fuel material may be selected from the group consisting of uranium silicide ($U_3Si_2$), uranium dioxide ($UO_2$), uranium nitride (UN) and mixtures and combinations thereof.

In another aspect, the invention provides a method of incorporating a fuel additive component to a nuclear fuel. The method includes obtaining a bulk fuel material in powder form; selecting the fuel additive component from the group consisting of metal, metal alloy, metal oxide, metalloid oxide, metal carbide, metalloid carbide, metal nitride, metalloid nitride, metal boride, metalloid boride, and mixtures or alloys thereof in powder form, wherein the grain size of the bulk fuel material is larger than the grain size of the fuel additive component; and combining the bulk fuel material with the fuel additive component.

The fuel additive component can be selected such that the grain size is less than Vr*Rl/4, wherein "Vr" is the desired volume ratio of the fuel additive component to the bulk fuel material and "Rl" is the radius of grains in the bulk fuel material.

The fuel additive component and the bulk fuel material can be combined in selected amounts such that the volume ratio of the fuel additive component to the bulk fuel material is greater than 4*Rs/Rl, wherein "Rs" is the radius of the smaller grains in the fuel additive component and "Rl" is the radius of the larger grains in the bulk fuel material.

In the method, when combining the bulk fuel material and the fuel additive component, smaller grains of the fuel additive component can coat larger grains of the bulk fuel material.

Furthermore, incorporating the fuel additive component to the bulk fuel material can produce a resultant fuel composition having improved water resistance compared to a fuel composition absent of the fuel additive component.

In still another aspect, the invention provides a nuclear fuel pellet that includes a first material composed of bulk uranium; and a coating composed of a second material selected from the group consisting of metal, metal alloy, metal oxides, metalloid oxides, metal carbide, metalloid carbide, metal nitride, metalloid nitride and mixtures or alloys. The first material has a grain size greater than the grain size of the second material.

DETAILED DESCRIPTION OF THE INVENTION

The invention relates to improved nuclear fuels and methods of producing them. A uranium fuel pellet having large grains of one component surrounded with a coating formed by a second granular material is provided. Various properties, e.g., thermal conductivity and water resistance, of the large grains may be improved by addition of the coating thereon formed by the second granular material. The second granular material is incorporated in the fuel by blending or mixing with the large grains in pelleting. Other known fuel additives may also be incorporated, such as, lubricants, burnable absorbers, and/or pore-formers. The powders/grains are pressed and compacted into a cylindrical pellet form, and then sintered into the nuclear fuel pellets. The sintered pellets may be machined to specific dimensions. An amount of the second granular material used should be sufficient to provide good coverage or complete coverage of the surface of the large grains. It has been found that an amount of the second granular material can be minimized by changing, e.g., reducing, the size of the additive relative to the large grains of the bulk material. The grains of the second granular material can be milled to reduce their size, e.g., diameter or radius. The surface area to volume ratio of the second granular material is reduced to a smaller diameter than the large grains. The invention allows for maximizing the amount of fuel (e.g., uranium nitride, uranium silicide, or uranium dioxide) in a pellet by minimizing the amount of additive, while achieving the improved properties.

In certain embodiments, the invention includes nuclear fuels having improved water, steam or air resistance and/or thermal conductivity, and methods for their production. According to the invention, the nuclear fuel includes a bulk fuel material and a fuel additive component. The bulk fuel material is in a dry form, e.g., granular or powder, and typically is composed of one or more of uranium nitride (UN), uranium silicide ($U_3Si_2$), and uranium dioxide ($UO_2$). The fuel additive component is in a dry form, e.g., granular or powder, and is selected from one or more known metals, metal alloys, metal oxides, metalloid oxides, metal nitrides, metalloid nitrides, metal carbides, metalloid carbides, metal borides, metalloid borides, and mixtures and combinations thereof.

In certain embodiments, a metal fuel additive component includes one or more of chromium (Cr), zirconium (Zr) and aluminum (Al), and a metal alloy fuel additive component includes one or more alloys thereof, such as, aluminum chromium (AlCr) alloy. An oxide fuel additive component includes one or more of uranium dioxide ($UO_2$), beryllium oxide (BeO), zirconium oxide ($ZrO_2$), chromium oxide ($Cr_2O_3$), titanium oxide ($TiO_2$) and yttrium oxide ($Y_2O_3$). The fuel additive component may include mixtures or combinations of these metals, alloys and oxides.

The fuel additive component may be in the form of a glass including one or more elements selected from the group consisting of aluminum (Al), boron (B), silicon (Si), sodium (Na), lithium (Li), and compounds and combinations thereof.

The fuel additive component is combined with the bulk fuel material to produce a nuclear fuel having one or more improved properties, such as, enhanced water resistance and/or thermal conductivity, as compared to the properties of the bulk fuel material absent of the fuel additive component. The desired improved properties are achieved with an optimal, e.g., minimal, amount of the fuel additive component being combined with the bulk fuel material. Without intending to be bound by any particular theory, it is believed that presence of the fuel additive component having a lower density, as compared to the density of the bulk fuel material, reduces the density of a resultant fuel composition (as compared to a nuclear fuel composed of the bulk fuel material only). In order to minimize the reduction in density of the resultant fuel composition, it is preferred to optimize, e.g., minimize, the amount of fuel additive component.

The bulk fuel material has a larger grain or particle size as compared to the fuel additive component. Upon combining the fuel additive component with the bulk fuel material, the fuel additive component essentially covers or coats the bulk fuel material. Without intending to be bound by any particular theory, it is believed that the smaller sized grains or particles of the fuel additive component stick or adhere to the surface of the larger sized grains or particles in the bulk fuel material. As used herein, the term "smaller grains/particles" or "small grains/particles" means that the grains or particles in the fuel additive component are smaller in size, (e.g., have a smaller/lesser radius or diameter) than the grains or particles in the bulk fuel material. As a result, the fuel additive component effectively protects the bulk fuel material (e.g., from water). The fuel additive component is used in an amount that is effective to sufficiently cover or coat the total surface of the (larger) grains in the bulk fuel material. As aforementioned, it preferable to optimize, e.g., minimize, the amount of fuel additive component used. In certain embodiments, the fuel additive component constitutes an amount that is effective to sufficiently cover or coat the total surface area of the grains in the bulk fuel material, and does not significantly reduce the density such that a resultant fuel material is economically tenable.

In accordance with the invention, a uranium fuel pellet can be produced having larger grains of one component surrounded with a coating formed from a second granular material, e.g., additive component. The properties of the larger grains are improved by the coating on the larger grains formed from the other granular material, e.g., additive component.

In order to provide good, e.g., sufficient, coverage of the surface area of the bulk fuel material with a minimum amount of the fuel additive component, the surface area to volume ratio of the fuel additive component is reduced; the grain size (e.g., diameter or radius) of the fuel additive component is smaller as compared to the larger grain size (e.g., diameter or radius) of the bulk fuel material. Thus, for complete coverage of the large grains of the bulk fuel material by the small grains of the fuel additive component, the volume ratio of small to large grains is greater than 4 times the ratio of the small grain radius to large grain radius (i.e., 4*Rs/Rl), wherein "Rs" is the radius of the small grains (of the fuel additive material), and "Rl" is the effective radius of the large grains (bulk fuel material).

$$Vr \text{ (small to large grains)} > 4*Rs/Rl \quad \text{(Equation 1)}$$

The grains or particles of the fuel additive component are milled to a diameter that is less than Vr*Rl/4, wherein "Vr" is the desired volume ratio of the additive component to the bulk component. For example, for a desired volume ratio of less than 10%, the fuel additive component is milled to have an effective radius less than 0.025 times the effective radius of the large grains, on average (0.10=4(0.025)). The minimum mass ratio of small grain material is ρs/ρl*4*Rs/Rl, wherein "ρs" is the density of the small grain material and "ρl" is the density of the large grain material.

$$\text{Minimum Mass Ratio (small grain)} = (\rho s/\rho l)*(4*Rs/Rl) \quad \text{(Equation 2)}$$

The "Rs" and "Rl" are the average, effective radii of the small and large grain material, respectively, wherein the effective radius is defined as the radius of the sphere that gives the same average volume as the average radii of the small and large grain materials. Thus, the amount of the fuel additive component is minimized by changing, e.g., reducing, the grain size of the additive relative to the grain size of the bulk material, e.g., the ratio of the grain sizes.

In certain embodiments, an improved uranium fuel pellet is produced by combining the powder bulk fuel material having larger grains and the powder fuel additive component having smaller grains, such that the smaller grains substantially form a coating to cover the surface of the larger grains. The grains sizes are selected/adjusted in accordance with the aforementioned equations, and may be milled accordingly prior to combining with the larger grains. One fuel additive component or more than one fuel component may be combined with the bulk fuel material. The powder of larger grains coated with the smaller grains is pelletized and sintered to form the uranium fuel pellet.

The invention includes, but is not limited to, the following fuel improvements:
(i) increased thermal conductivity of uranium dioxide (large grains) by adding BeO (thin coating on the large grains of the uranium dioxide);
(ii) increased water resistance of uranium nitride (large grains) by adding uranium dioxide (thin coating on the large grains of the uranium nitride); and
(iii) improved waterproofing of uranium silicide (large grains) by adding one or more of BeO, Cr, Zr or $UO_2$ (thin coating on the large grains of the uranium silicide).

While the invention has been described in terms of various specific embodiments, those skilled in the art will recognize that the invention can be practiced with modifications within the spirit and scope of the appended claims.

I claim:

1. A nuclear fuel comprising:
a bulk fuel material in a powder form; and
a fuel additive component selected from the group consisting of metal, metal alloy, metal oxide, metalloid oxide, metal carbide, metalloid carbide, metal nitride, metalloid nitride, metal boride, metalloid boride and mixtures or alloys thereof in a powder form,
wherein a grain size of the bulk fuel material is larger than a grain size of the fuel additive component,
wherein a volume ratio of the grain size of the fuel additive component to the grain size of the bulk fuel material is greater than 4*Rs/Rl, wherein "Rs" is the radius of the smaller grains in the fuel additive component and "Rl" is the radius of the larger grains in the bulk fuel material.

2. The nuclear fuel of claim 1, wherein the grain size in the fuel additive component is less than Vr*Rl/4, wherein "Vr" is the volume ratio of the grain size of the fuel additive component to the grain size of the bulk fuel material.

3. The nuclear fuel of claim 1, wherein the fuel additive component is selected from the group consisting of Cr, Zr, Al, AlCr alloy, $UO_2$, BeO, $ZrO_2$, $Cr_2O_3$, $TiO_2$, $Y_2O_3$ and mixtures and combinations thereof.

4. The nuclear fuel of claim 1, wherein the fuel additive component is in the form of a glass comprising a compound selected from the group consisting of Al, B, Si, Na, Li, and compounds and combinations thereof.

5. The nuclear fuel of claim 1, wherein the bulk fuel material is selected from the group consisting of UN, $U3\,Si_2$, and $UO_2$, and mixtures and combinations thereof.

6. The nuclear fuel of claim 1, wherein the volume ratio is less than 10%.

7. A method of incorporating a fuel additive component to a nuclear fuel, comprising:
obtaining a bulk fuel material in powder form;
selecting the fuel additive component from the group consisting of metal, metal alloy, metal oxide, metalloid oxide, metal carbide, metalloid carbide, metal nitride, metalloid nitride, metal boride, metalloid boride and mixtures or alloys thereof in powder form,
wherein the grain size of the bulk fuel material is larger than the grain size of the fuel additive component; and
combining the bulk fuel material with the fuel additive component in selected amounts to achieve a volume ratio of the grain size of the fuel additive component to the grain size of the bulk fuel material is greater than 4*Rs/Rl, wherein "Rs" is the radius of the smaller grains in the fuel additive component and "Rl" is the radius of the larger grains in the bulk fuel material.

8. The method of claim 7, wherein the fuel additive component is selected such that the grain size is less than Vr*Rl/4, wherein "Vr" is the volume ratio of the gran size of the fuel additive component to the grain size of the bulk fuel material.

9. The method of claim 7, wherein smaller grains of the fuel additive component coat larger grains of the bulk fuel material.

10. The method of claim 7, wherein incorporating the fuel additive component to the bulk fuel material produces a resultant fuel composition having improved water resistance compared to a fuel composition absent of the fuel additive component.

11. The method of claim 7, wherein the volume ratio is less than 10% by milling the fuel additive.

12. A nuclear fuel pellet, comprising:
a first material composed of bulk uranium; and
a coating composed of a second material selected from the group consisting of metal, metal alloy, metal oxide, metalloid oxide, metal carbide, metalloid carbide, metal nitride, metalloid nitride, metal boride and metalloid boride and mixtures or alloys, deposited on the first material,
wherein the first material has a grain size greater than the grain size of the second material,
wherein a volume ratio of the grain size of the fuel additive component to the grain size of the bulk fuel material is greater than 4*Rs/Rl, wherein "Rs" is the radius of the smaller grains in the fuel additive component and "Rl" is the radius of the larger grains in the bulk fuel material.

13. The nuclear fuel pellet of claim 12, wherein the volume ratio is less than 10%.

\* \* \* \* \*